Patented Oct. 30, 1934

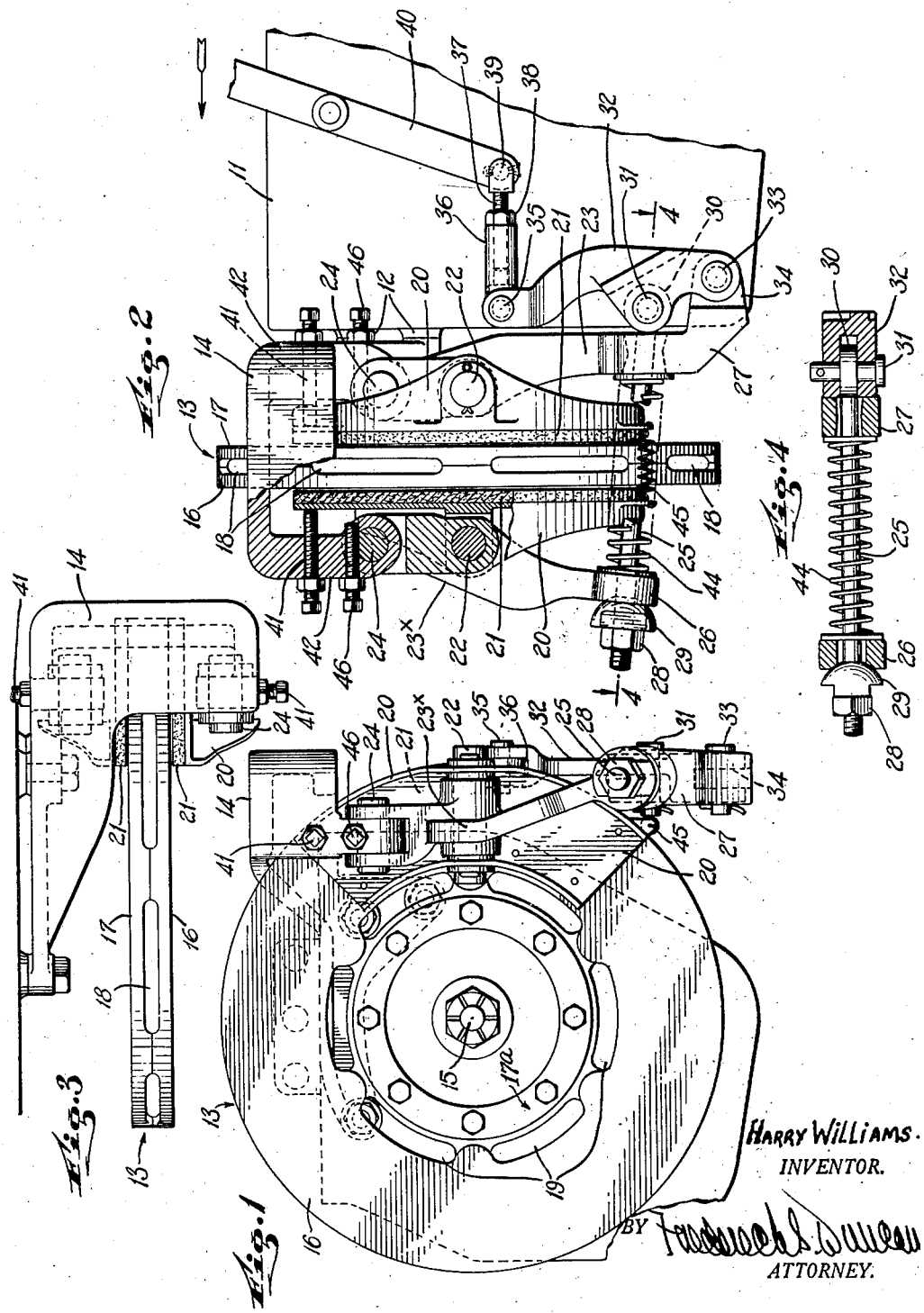

1,978,974

UNITED STATES PATENT OFFICE 1,978,974

DISK BRAKE

Harry Williams, Birmingham, Mich., assignor to American Cable Company, Inc., a corporation of Delaware Application May 20, 1932, Serial No. 612,459

4 Claims. (Cl. 188—72)

This invention relates to brakes and has for an object the provision of mechanism for operating a well-known type of brake assembly in which a rotor having a disk provided with lateral braking surfaces is supported rotatably upon a suitable structure, in combination with a pair of brake-shoes carried by levers positioned one on each side of the rotor-disk, and mounted to swing oppositely to each other and transversely to the plane of the disk for the purpose of applying said brake-shoes to the disk with equalized pressure, and to clear the brake-shoes from the rotor-disk when the brake-shoes are out of action.

A particular object of the invention is to provide improved means to insure substantially parallel relation between the faces of the brake-shoes and the disk-faces.

Another object of the invention is to provide a compact brake assembly that can be applied readily to existing structures, such as the transmission casings of automobiles, and so organized that when in place the parts are readily accessible for inspection, adjustment and replacement.

The above, and other, features of the invention are illustrated and described fully in the accompanying drawing and specification, and are pointed out in the claims.

In the drawing,

Fig. 1 is a view in side elevation of a brake mechanism in which the invention is embodied.

Fig. 2 is a view in side elevation, partly in section, of said brake mechanism and associated parts of the supporting structure.

Fig. 3 is a top plan view of the structure shown in Fig. 1.

Fig. 4 is a detail view in section on the line 4—4 of Fig. 2.

In a now-preferred embodiment of the invention selected for illustration and description, the part designated by the reference character 11 is part of the transmission case of an automobile having a boss, or bosses, 12 on which is mounted a brake anchor bracket 14 adapted to support brake mechanism in suitable position to co-operate with a rotor-disk 13 fixed upon a transmission shaft 15 with which the rotor-disk rotates relatively to the brake mechanism.

The rotor-disk may be of any suitable construction, and is herein illustrated as a ventilated disk of the type disclosed and claimed in the co-pending application of Harry Williams and Walter M. Lipps, filed January 4, 1930, Ser. No. 418,463, now Patent No. 1,941,122, issued December 26, 1933, being characterized by a plurality of disk-members 16 and 17 bolted together upon a collar 17a secured to the shaft 15, and formed with radial openings 18 in communication with lateral openings 19 by means of which automatic ventilation of the rotor-disk structure is accomplished.

On each side of the rotor-disk is shown a brake-shoe 20 of arcuate form having a suitable liner 21 of friction material, each brake shoe being mounted at its medial portion upon a pivot 22 carried by a lever 23, 23x which is free to swing toward and away from the rotor-disk upon a pivot 24 extending through one end of the lever and mounted in the brake-anchor bracket 14, one lever being mounted at each side of the rotor disk.

Each brake-shoe 20 is mounted in a portion of its supporting lever 23 intermediate the pivoted end of the lever and the swinging end of the lever, and suitable means are provided to cause the levers 23, 23x to approach each other in such a manner as to apply the brake-shoes 20 to the braking faces of the disk 13 with equal pressure.

Any suitable means, either hand-actuated, or power-actuated, or both, may be utilized for applying the brakes, and in the instance illustrated such means take the form of a rod, link, or bolt 25, extending through the free ends 26 and 27 of the levers respectively, which are suitably apertured to receive this bolt, the latter having at one end a nut 28 and washer 29, for purposes of adjustably limiting movement of the levers to prevent separation of the levers beyond a pre-determined distance apart.

At the right-hand end of the bolt 25 is provided an eye 30 connected pivotally at 31 with an operating yoke-lever 32 which has its lower end connected pivotally, as at 33, to a lug 34 extending from the lever-end 27, while the upper, swinging end of the operating yoke lever is connected pivotally, as at 35, with an adjustable link or member comprising a socket part 36, and a bolt 37, with a jam-nut 38, this link having an eye and pivot connection, as at 39 with an actuating lever 40 which may in turn be connected with the hand, foot, or power actuated brake levers of the automobile.

The operating-yoke-lever 32 floats with the levers 23, 23x and when the actuating lever 40 is moved in the direction of the arrow (Fig. 2), the link 36 pulls on the end 35, turns the lever 32 around its pivot 33 on lug 34 of lever end 27 and at the same time pushes the latter toward the plane of rotation of the rotor disk 13, while the eye 30 of bolt 25 is drawn in the opposite direction, pulling the lever end 26 toward the plane of the rotor-disk 13, at the opposite side thereof, so that first one, and then the other, of the brake-shoes 20 is engaged with the corresponding braking face of the rotor-disk, and thereafter the two brake-shoes exert equal braking action upon the opposite faces of the rotor-disk, in well-known fashion.

In pursuance of the invention, provision is made for maintaining the brake-shoes 20 in substantially parallel relation with the braking surfaces of the rotor-disk 13, and as the preferred means to accomplish this provision, for the purpose of avoiding uneven wear upon the brake-linings 21, as they are worn away in use, I have fitted an adjustable screw or abutment device 41 through the wall 42 of the brake-anchor-bracket 14 in the vicinity of the lever pivot 24 at each side of rotor-disk 13.

These abutment screws can each be readily adjusted into position to be engaged by the adjacent free end of one of the brake-shoes when the said free ends swing outward from the rotor-disk to a predetermined extent, and so the extent of rotation of the brake-shoes upon their respective pivots can be controlled, and also the extent of clearance between each brake shoe and the adjacent face of the rotor-disk can be regulated.

In the position shown in Fig. 2, the brake-shoes are out of action, and the levers 23, 23x respectively occupy the outermost position permitted by engagement of the pivot-connection 33 with lever-end 27 on the right-hand, and the washer 29, engaged with lever-end 26 at the left-hand, this separated relative position being maintained normally by the expansive tendency of a compressed coil spring 44 which is provided for that purpose, surrounding the bolt 25.

A tension spring 45 connects together the other free ends of the brake-shoes 20, and tends to draw these ends of the shoes toward each other, and also to cause the free ends of the shoes adjacent to the abutment screws 41 to be maintained in constant engagement with the abutment screws, so that the brake linings 21 are normally presented in substantial parallelism with the braking faces of the rotor 13, and are kept out of contact with the rotor when not in action.

The screws 46 serve to fix the pivots 24 in their proper positions respectively in the brake hanger bracket 14.

I claim:—

1. The combination with a rotor disk, of a support, a pair of lever members each mounted pivotally on said support, at a point fixed with respect to said rotor disk, the free end of each lever member being adapted to swing at an angle to the surface of the rotor disk, a pair of brake shoes, one carried by each lever member pivotally at an intermediate portion of its free part and upon opposite sides of said rotor, means for moving the levers toward each other to apply the brake-shoes to the rotor disk with equal pressure, and means to maintain the faces of said brake shoes respectively in substantial parallelism with said rotor, said means comprising adjustable abutment screws mounted on said support adjacent to the lever pivots thereon and each adapted to be engaged with a free end of one of said brake-shoes to limit swinging of that end of the brake-shoe away from the rotor disk, and means tending to urge the other free ends of the brake-shoes respectively toward said rotor disk, 2. The combination with a rotor disk, of a support, a pair of lever members each mounted pivotally on said support, at a point fixed with respect to said rotor disk, the free end of each lever member being adapted to swing at an angle to the surface of the rotor disk, a pair of brake shoes, one carried by each lever member pivotally at an intermediate portion of its free part and upon opposite sides of said rotor, means for moving the levers toward each other to apply the brake-shoes to the rotor disk with equal pressure, and means to maintain the faces of said brake shoes respectively in substantial parallelism with said rotor, said means comprising adjustable abutment screws mounted on said support adjacent to the lever pivots thereon and each adapted to be engaged with a free end of one of said brake-shoes to limit swinging of that end of the brake-shoe away from the rotor disk, and means tending to urge the other free ends of the brake-shoes respectively toward said rotor disk, and means tending to swing the free portions of said levers away from each other to clear said brake-shoes from said rotor disk.

3. A brake and operating mechanism therefor comprising a support, a disk mounted rotatably relatively to said support, a pair of levers, each extending beside said disk, near opposite faces thereof, and respectvely having one of their ends mounted pivotally on said support, being adapted to swing independently of each other transversely to the plane of the disk, a pair of brake shoes each having its medial portion mounted pivotally on a medial portion of one of said levers, means to apply said brake shoes to the opposite faces of said disk with equalized pressure, and means to insure parallel relation between the faces of said brake shoes and the disk faces, said means comprising a pair of screw members carried by said support, one adjacent to and adapted to be moved adjustably against, a portion of one of said brake shoes adjacent to the pivot axis of the corresponding lever on said support spring, means tending to rotate said brake shoes on their medial pivots so as to maintain contact with said screws of the brake-shoe portions respectively adapted to be engaged therewith, spring means, interposed between the free portions of said levers, to urge said levers apart, thereby tending to carry said brake shoes clear from said disk, devices mounted upon, and adapted to float with, said free lever ends, by which said levers may be caused to approach each other and thereby apply said brake shoes to said disk with equalized pressure, and power-applying means to actuate said lever-operating devices.

4. A brake assembly comprising a support, a shaft mounted rotatably on said support and provided with a rotor disk, a pair of lever members mounted pivotally on said support and each carrying a pivoted brake shoe adapted to swing with its lever at an angle to a face of said rotor disk on opposite sides thereof, and devices to apply said brake shoe with equal pressure to said disk, said devices comprising a member transfixing the free ends of said levers and having at one end a connection with one of said levers and at its other end an eye, an operating lever having one end connected pivotally with a free end of one of said brake shoe levers, its other end adapted to be connected with power-applying means and its intermediate portion connected with said eye, said operating lever constituting a floating part acting to equalize the pressure applied to said brake shoes, the said brake assembly being further characterized by a spring tending to separate said brake shoe levers and a spring tending to rotate said brake shoes on their pivots in combination with an adjustable abutment means adapted to limit said rotation and thereby maintain said brake shoes parallel with said rotor disk.

HARRY WILLIAMS.